United States Patent
Dowlatkhah et al.

(10) Patent No.: US 11,382,163 B2
(45) Date of Patent: Jul. 5, 2022

(54) INSTANTIATING INTELLIGENT SERVICE DELIVERY PARAMETERS WITHIN PROTECTED HARDWARE

(71) Applicants: AT&T Intellectual Property I, L.P., Atlanta, GA (US); AT&T Mobility II LLC, Atlanta, GA (US)

(72) Inventors: Sangar Dowlatkhah, Alpharetta, GA (US); Erie Lai Har Lau, Redmond, WA (US); Zachary Bujnoch, San Antonio, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 152 days.

(21) Appl. No.: 15/847,547

(22) Filed: Dec. 19, 2017

(65) Prior Publication Data
US 2019/0191480 A1   Jun. 20, 2019

(51) Int. Cl.
*H04W 76/20* (2018.01)
*H04W 40/04* (2009.01)
(Continued)

(52) U.S. Cl.
CPC .......... *H04W 76/20* (2018.02); *H04L 47/787* (2013.01); *H04W 40/04* (2013.01); *H04W 88/02* (2013.01)

(58) Field of Classification Search
CPC .......... H04L 41/0816; H04L 41/5009; H04W 16/10; H04W 28/02
See application file for complete search history.

(56) References Cited

U.S. PATENT DOCUMENTS 7,882,386 B1   2/2011   Potnis et al.
8,468,368 B2   6/2013   Gladwin et al.
(Continued)

FOREIGN PATENT DOCUMENTS

WO   WO 2016192639 A1   12/2016
WO   WO 2017058067 A1   4/2017
(Continued)

OTHER PUBLICATIONS

Baliga et al., "VPMN: virtual private mobile network towards mobility-as-a-service", Proceedings of the second international workshop on Mobile cloud computing and services, ACM (2011). 5 Pages. http://ai2-s2-pdfs.s3.amazonaws.com/7e6e/2771f02a0d66faf693b19a7dbab52feebcf1.pdf
(Continued)

*Primary Examiner* — Khaled M Kassim
*Assistant Examiner* — Zhaohui Yang

(57) ABSTRACT

In one example, the present disclosure describes a device, computer-readable medium, and method for instantiating intelligent service delivery parameters within protected hardware. For instance, in one example, a method includes instantiating within a user endpoint device an end-to-end slice of a communications network, wherein the slice is configured to carry data over the communications network subject to a predefined combination of network service metrics, transmitting user data from the user endpoint device to the communications network via the slice when the user endpoint device is able to establish a radio connection to the communications network, and storing the user data locally in the user endpoint device when the user endpoint device is unable to establish a radio connection to the communications network.

20 Claims, 3 Drawing Sheets

(51) Int. Cl.
*H04L 47/783* (2022.01)
*H04W 88/02* (2009.01)

(56) References Cited

U.S. PATENT DOCUMENTS

| | | |
|---|---|---|
| 8,880,659 B2 | 11/2014 | Mower et al. |
| 8,908,577 B2 | 12/2014 | Walker et al. |
| 9,460,148 B2 | 10/2016 | Grube et al. |
| 9,800,673 B2 | 10/2017 | Parikh et al. |
| 2015/0169615 A1* | 6/2015 | Batchu .................. G06F 16/25 707/624 |
| 2017/0054595 A1* | 2/2017 | Zhang ..................... H04L 41/12 |
| 2017/0085493 A1* | 3/2017 | Senarath ............... H04L 47/522 |
| 2017/0086049 A1 | 3/2017 | Vrzic |
| 2017/0289791 A1* | 10/2017 | Yoo ..................... H04W 68/005 |
| 2017/0302568 A1 | 10/2017 | Meng |
| 2017/0303259 A1 | 10/2017 | Lee et al. |
| 2017/0311290 A1* | 10/2017 | Adjakple ............. H04W 76/18 |
| 2017/0332212 A1 | 11/2017 | Gage |
| 2017/0332295 A1 | 11/2017 | Sunay |
| 2017/0332421 A1 | 11/2017 | Sternberg et al. |
| 2018/0220277 A1* | 8/2018 | Senarath ............... H04M 15/59 |
| 2018/0316564 A1* | 11/2018 | Senarath ............. H04L 41/5051 |
| 2018/0317144 A1* | 11/2018 | Hori ..................... H04L 61/2007 |
| 2019/0159107 A1* | 5/2019 | Kim ...................... H04W 60/06 |
| 2019/0191309 A1* | 6/2019 | Kweon ............... H04L 12/1407 |
| 2021/0051753 A1* | 2/2021 | Ohlsson ................ H04W 76/11 |

FOREIGN PATENT DOCUMENTS

| | | |
|---|---|---|
| WO | WO 2017153667 A1 | 9/2017 |
| WO | WO 2017160109 A1 | 9/2017 |
| WO | WO 2017173404 A1 | 10/2017 |
| WO | WO 2017177364 A1 | 10/2017 |
| WO | WO 2017178921 A1 | 10/2017 |
| WO | WO 2017195201 A1 | 11/2017 |
| WO | WO 2017200978 A1 | 11/2017 |

OTHER PUBLICATIONS

Siddiqui et al., "Hierarchical, virtualised and distributed intelligence 5G architecture for low-latency and secure applications", Transactions on Emerging Telecommunications Technologies vol. 27 Issue 9 (2016). pp. 1233-1241. http://www.charisma5g.eu/wp-content/uploads/2015/08/5G-TETT2016-CHARISMA_final.pdf.
NGMN Alliance, "5G End-to-End Architecture Framework", Version v0.8.1 (2017). 36 Pages. https://www.ngmn.org/fileadmin/user_upload/171006_NGMN_E2EArchFramework_v0.8.1_01.pdf \* cited by examiner

INSTANTIATING INTELLIGENT SERVICE DELIVERY PARAMETERS WITHIN PROTECTED HARDWARE

The present disclosure relates generally to software defined networking, and relates more particularly to devices, non-transitory computer-readable media, and methods for instantiating intelligent service delivery parameters within protected hardware.

BACKGROUND

Wearable smart devices, such as wearable health monitors and fitness trackers, can monitor and record various health-related metrics associated with a user. For instance, they may track and store anything from the number of steps a user walks in a day, to the user's blood sugar or heart rate, to the humidity level when the user is running on a treadmill. This information may be transmitted directly to a remote server (e.g., a server operated by a third party) in near-real time (e.g., substantially immediately, subject to any network delays) or may be incorporated as add-on metadata in future transmissions to the server. The information may be retrieved from the server and analyzed as part of a diagnostic and/or statistical application or service.

SUMMARY

In one example, the present disclosure describes a device, computer-readable medium, and method for instantiating intelligent service delivery parameters within protected hardware. For instance, in one example, a method includes instantiating within a user endpoint device an end-to-end slice of a communications network, wherein the slice is configured to carry data over the communications network subject to a predefined combination of network service metrics, transmitting user data from the user endpoint device to the communications network via the slice when the user endpoint device is able to establish a radio connection to the communications network, and storing the user data locally in the user endpoint device when the user endpoint device is unable to establish a radio connection to the communications network.

In another example, a device includes a processor and a computer-readable medium storing instructions which, when executed by the processor, cause the processor to perform operations. The operations include instantiating within a user endpoint device an end-to-end slice of a communications network, wherein the slice is configured to carry data over the communications network subject to a predefined combination of network service metrics, transmitting user data from the user endpoint device to the communications network via the slice when the user endpoint device is able to establish a radio connection to the communications network, and storing the user data locally in the user endpoint device when the user endpoint device is unable to establish a radio connection to the communications network.

In another example, an apparatus includes a virtual network function to instantiate an end-to-end slice of a remote communications network, wherein the slice is configured to carry data over the remote communications network subject to a predefined combination of network service metrics, and a radio transceiver to establish a connection to the communications network and to transmit the data to the communications network via the slice.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
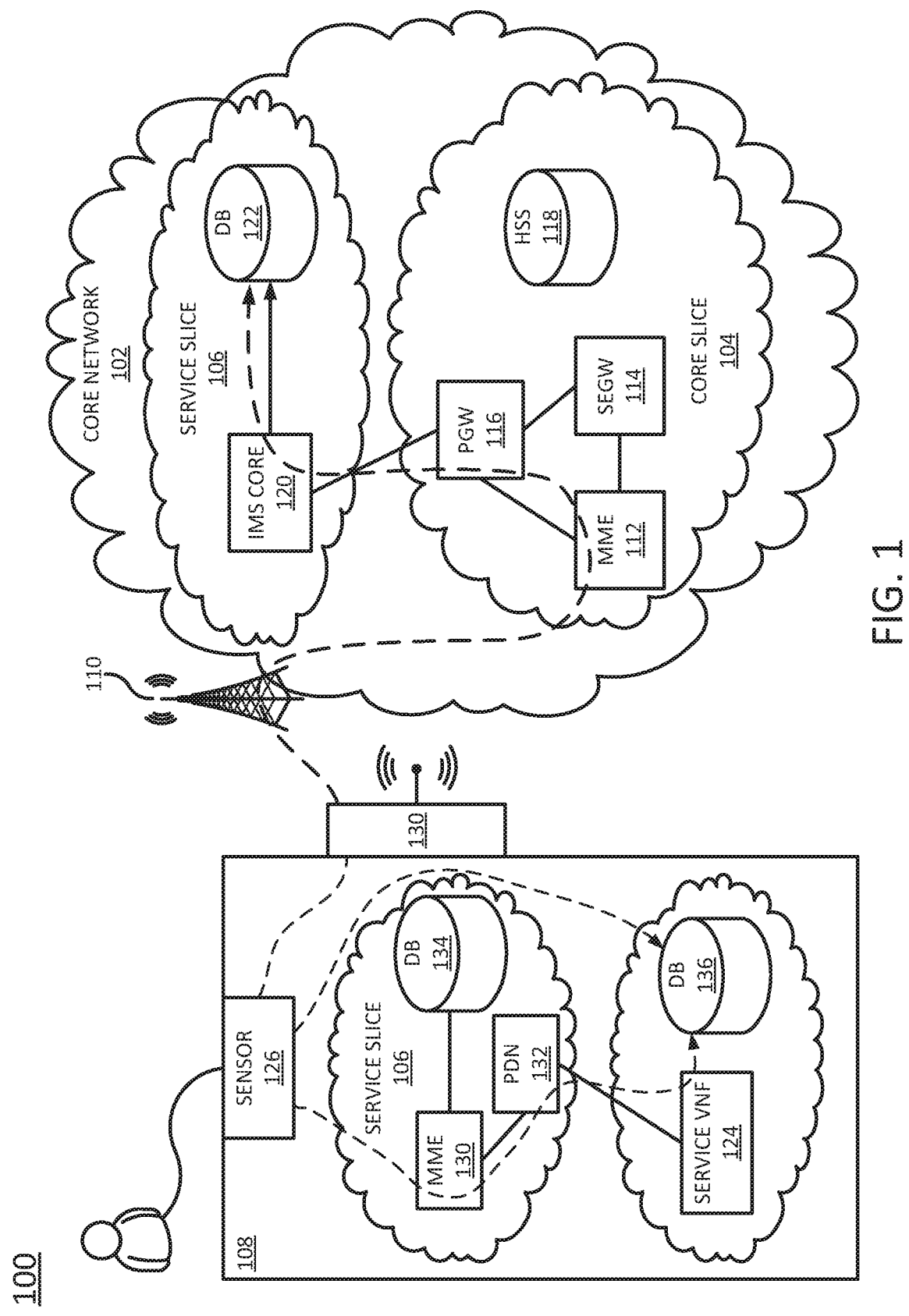
FIG. 1 illustrates an example network related to the present disclosure.

In one example, the present disclosure provides a means for instantiating intelligent service delivery parameters within protected hardware. As discussed above, information collected by a wearable smart device such as a health monitor or fitness tracker may be transmitted directly to a remote server (e.g., a server operated by a third party, such as a doctor, a hospital, or another healthcare provider) in near-real time (e.g., substantially immediately, subject to any network delays) or may be incorporated as add-on metadata in future transmissions to the server. The information may be retrieved from the server and analyzed as part of a diagnostic and/or statistical application or service.

Some applications may demand a great deal of precision when it comes to the collection of the information. Moreover, some of the collected information may be highly personal and/or sensitive in nature, and may thus require a heightened level of security when it comes to transmission and storage. Third generation partnership project (3GPP) subscriber identity module (SIM)-enabled networks may ensure the secure transmission of sensitive personal data; however, it is not always possible for the user and his or her device to remain within the radio coverage area of the 3GPP network, and using the session continuity between the 3GPP radio and other, less secure wireless transmission methods (e.g., Wi-Fi) may not be possible or may not provide the necessary level of security.

Examples of the present disclosure define "slices" in a communications network, where a slice of the network is a combination of network functions and/or services that may be instantiated for services and applications supported by the network. For instance, a particular slice of the network may be configured to carry data over the network subject to a specific, predefined combination of network service metrics (e.g., mean time between failures, mean time to repair, and/or mean time repair, data rate, data throughput, jitter, delay, bandwidth and/or any other metrics that affect the speed or quality of data delivery). According to this model, particular types of data (e.g., medical data) may be carried over an assigned slice that is created by and within a user endpoint device. In particular, the user endpoint device includes one or more virtual network function (VNF) applications that create the end-to-end slice of the network within the device hardware. The user endpoint device includes a radio transceiver for accessing the core network, when possible, to communicate with the service network. If unable to access the core network via the radio transceiver, the session may continue with an internal slice defined within the user endpoint device. Then, once the user endpoint device is able to access the core network, it syncs any data stored internally during the session with data stored in the core network.

Although examples of the present disclosure are discussed within the context of electronic health data delivery, it will be understood that the present disclosure is applicable to any type of service or application that is provided over a communications network, and particularly to any type of service of application that requires the transmission of sensitive information over a communications network (e.g., military applications, financial applications, etc.).

To better understand the present disclosure, FIG. 1 illustrates an example network 100, related to the present disclosure. As shown in FIG. 1, the network 100 may comprise a content distribution network (e.g., data network) that connects various devices (e.g., mobile devices and/or home network devices such as set-top boxes, televisions, routers, personal computers, and the like) with one another and with various other devices via a core network 102.

In one example, the core network 102 may functionally comprise an evolved packet core (EPC) network. In a further example, the core network 102 may comprise a cloud radio access network (RAN). For instance, a cloud RAN is part of the $3^{rd}$ Generation Partnership Project (3GPP) fifth generation (5G) specifications for mobile networks. As part of the migration of cellular networks toward 5G, a cloud RAN may be coupled to an EPC network until new cellular core networks are deployed in accordance with 5G specifications. In one example, the cloud RAN network may include one or more cell sites and a baseband unit (BBU) pool. For instance, FIG. 1 illustrates one example cell site 110. In a cloud RAN, radio frequency (RF) components, also referred to as remote radio heads (RRHs) may be deployed remotely from BBUs, e.g., atop cell site masts, buildings, and so forth. In one example, the BBU pool may be located at distances as far as 20-80 kilometers or more away from the antennas/RRHs of the cell site 110. It should also be noted in accordance with efforts to migrate to 5G networks, cell sites may be deployed with new antenna and radio infrastructures such as multiple input multiple output (MIMO) antennas and millimeter wave antennas. In this regard, a cell, e.g., the footprint or coverage area of a cell site, may, in some instances, be smaller than the coverage provided by NodeBs or evolved NodeBs (eNodeBs) of a 3G-4G RAN infrastructure. For example, the coverage of a cell site utilizing one or more millimeter wave antennas may be 1000 feet or less.

Although a cloud RAN infrastructure may include distributed RRHs and centralized BBUs, a heterogeneous network may include cell sites where RRH and BBU components remain co-located at the cell site. For instance, cell cite 110 may include RRH and BBU components. Thus, cell site 110 may comprise a self contained "base station."

In one example, the core network 102 provides various functions that support wireless services in a long term evolution (LTE) environment. In one example, the core network 102 is an Internet Protocol (IP) packet core network that supports both real-time and non-real-time service delivery across an LTE network, e.g., as specified by the 3GPP standards. In one example, all cell sites in the core network 102 are in communication with the core network 102 via BBUs. In operation, user endpoint device 108 may access wireless services via the cell site 110. It should be noted that any number of cell sites can be deployed. In one illustrative example, the core network 102 may comprise one or more cell sites.

In one example, the core network 102 comprises a plurality of "slices," where each slice is characterized by a combination of network functions and/or services that may be instantiated for services and applications supported by the network 100. For instance, each slice of the network 100 may be characterized by different combinations of network service metrics, such as different delay and bandwidth metrics. Thus, each network slice may be associated with its own service level agreement (SLA) and performance guarantee, which may differ from the SLAs and performance guarantees associated with other network slices. According to this model, particular types of data (e.g., medical data, financial data, etc.) may be carried over an assigned slice. Different slices may be defined for different types of data or services (e.g., healthcare services, navigation services, emergency services, etc.). Moreover, new slices can be instantiated or duplicated dynamically. In the example illustrated in FIG. 1, the plurality of slices includes at least a core slice 104 and a service slice 106. The core slice 104 may be configured to provide the user endpoint device 108 with secure access to the core network 102, while the service slice 106 may be configured to store and/or process a specific type of sensitive user data, such as health data (e.g., heart rate, blood pressure, etc.), financial data (credit card numbers, bank balances, etc.), or another type of data. The service slice 106 may be managed by a service provider, such as a healthcare service provider.

In the core slice 104, network devices such as a mobility management entity (MME) 112 and security gateway (SeGW) 114 support various functions as part of the core network 102. For example, the MME 112 is the control node for the LTE core network 102. In one example, the MME 112 is responsible for UE (user equipment) tracking and paging (e.g., such as retransmissions), bearer activation and deactivation process, selection of a serving gateway (SGW), and authentication of a user. In one example, the SeGW 114 establishes Internet Protocol security (IPsec) tunnels using Internet Key Exchange version 2 (IKEv2) signaling for IPsec tunnel management. IPsec tunnels are responsible for delivering all packet data services between the user endpoint device 108 and the core network 102, and particularly between the user endpoint device 108 and the service slice 106 of the core network 102. The core slice 104 may also comprise a packet data network gateway (PGW) 116 which serves as a gateway that provides access between the core network 102 and various other data networks, as well as between the core slice 104 and the service slice 106. The PGW 116 may also be referred to as a PDN gateway, a PDN GW, or a PDN. The core slice 104 may further include a home subscriber server (HSS) 118 that functions as a master user database supporting the IMS network entities that actually handle calls. The HSS 118 may contain, for example, user-related information (e.g., profiles). The HSS 118 may also perform authentication and authorization of users and can provide information about users' locations and IP information.

In one example, the service slice 106 comprises an IP Multimedia Subsystem (IMS) core 120 and a database (DB) 122. The IMS core 120 delivers IP multimedia services, which in one example may comprise services that perform diagnostic and/or statistical analysis of data transmitted by the user endpoint device 108. For instance, where the service slice 106 is configured to store electronic health data relating to users, the diagnostic and/or statistical analysis may comprise an analysis of user health data (e.g., sensor readings indicating a user's steps walked, blood sugar, blood pressure, heart rate, blood oxygenation, blood alcohol content, or the like).

The DB 122 may store the data transmitted by the user endpoint device 108, as well as any analyses that may be performed by applications in the IMS core 120. For instance, where the service slice 106 is configured to store electronic health data relating to users, the DB 122 may store user profiles, which can be dynamically updated with health data transmitted by the user endpoint device 108. For instance, the health data could include sensor readings indicating a user's steps walked, blood sugar, blood pressure, heart rate, blood oxygenation, blood alcohol content, or the like. The user profiles may also include target ranges for the health-related metrics related to the sensor readings, as well as the results of prior analyses of the transmitted data (e.g., user has shown a history of high blood pressure). Other health-related data, including healthcare provider and healthcare insurance provider and coverage information, could also be included in the user profiles. Further examples of the user profiles may include contact information (address, telephone number, email address), identifying information (e.g., name or patient identifier), and/or demographic information (e.g., age, gender, nationality, etc.) for the users. User profiles may be stored in encrypted form to protect user privacy.

As referenced above, in one example, the core network 102 may be in communication with one or more user endpoint devices (also referred to as "endpoint devices" or "UE"), including user endpoint device 108. In one example, the user endpoint device 108 may be any type of subscriber/customer endpoint device configured for wired or wireless communication such as a desktop computer, a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, and the like. In one example, the user endpoint device 108 may have both cellular and non-cellular access capabilities and may further have wired communication and networking capabilities. In one example, the user endpoint device 108 includes a radio transceiver 130 for communicating with the core network 102.

In one example, the user endpoint device 108 includes a service virtual network function (VNF) 124. The service VNF 124 comprises one or more virtual machines running software and processes for instantiating parameters for the secure delivery of data services, e.g., for the secure transmission of sensitive user data to the core network 102. These parameters may be stored in a database (DB) 136.

In one particular example, the service VNF 124 is configured to create an end-to-end slice of the network 100 within the device hardware. In this case, the service slice 106 extends not just through the core network 102, but also into the user endpoint device 108 as illustrated. The portion of the service slice 106 residing within the user endpoint device 108 may include one or more resources mirroring resources of the portion of the service slice 106 that resides within the core network 102, such as an MME 130, a PDN 134, and a database (DB) 134. The DB 134 may store sensitive user data that is transmitted to the DB 122. Thus, the DB 134 may be considered a "light" version of the DB 122.

In the example where the network 100 is configured to collect and store electronic health data for patients, the sensitive user data may comprise user health data. In this case, the user endpoint device 108 may be a device operated by a patient and may include one or more sensors 126 for monitoring health-related conditions of the patient (e.g., steps walked, blood sugar, blood pressure, heart rate, blood oxygenation, blood alcohol content, or the like). The readings from the sensor(s) 126 may be stored in the DB 134 and transmitted to the DB 122.

In one example, when radio access to the core network 102 is available to the user endpoint device 108, the user endpoint device 108 may deliver the sensitive user data stored on the user endpoint device 108 (e.g., in DB 134) via the service slice 106 to the core network 102, and more specifically to the DB 122. When radio access to the core network 102 is unavailable to the user endpoint device 108, the user endpoint device 108 may store the sensitive user data locally (e.g., in the DB 134), and then, once radio access is reestablished, transmit the sensitive user data via the end-to-end service slice 106 to the core network 102 (e.g., to the DB 122). Thus, the DB 134 may be synced to the DB 122, or vice versa.

It should be noted that although only one user endpoint device 108 is illustrated in FIG. 1, any number of user endpoint devices may be deployed in the network 100, including additional user endpoint devices that are configured in a manner similar to the user endpoint device 108.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, the user endpoint device 108 may host an operating system for presenting a user interface that may be used to send data to the core network 102.

Those skilled in the art will realize that the network 100 has been simplified. For example, the network 100 may include other network elements (not shown) such as border elements, routers, switches, policy servers, security devices, a content delivery network (CDN) and the like. The network 100 may also be expanded by including additional endpoint devices, access networks, network elements, application servers, etc. without altering the scope of the present disclosure.

Figure 2:
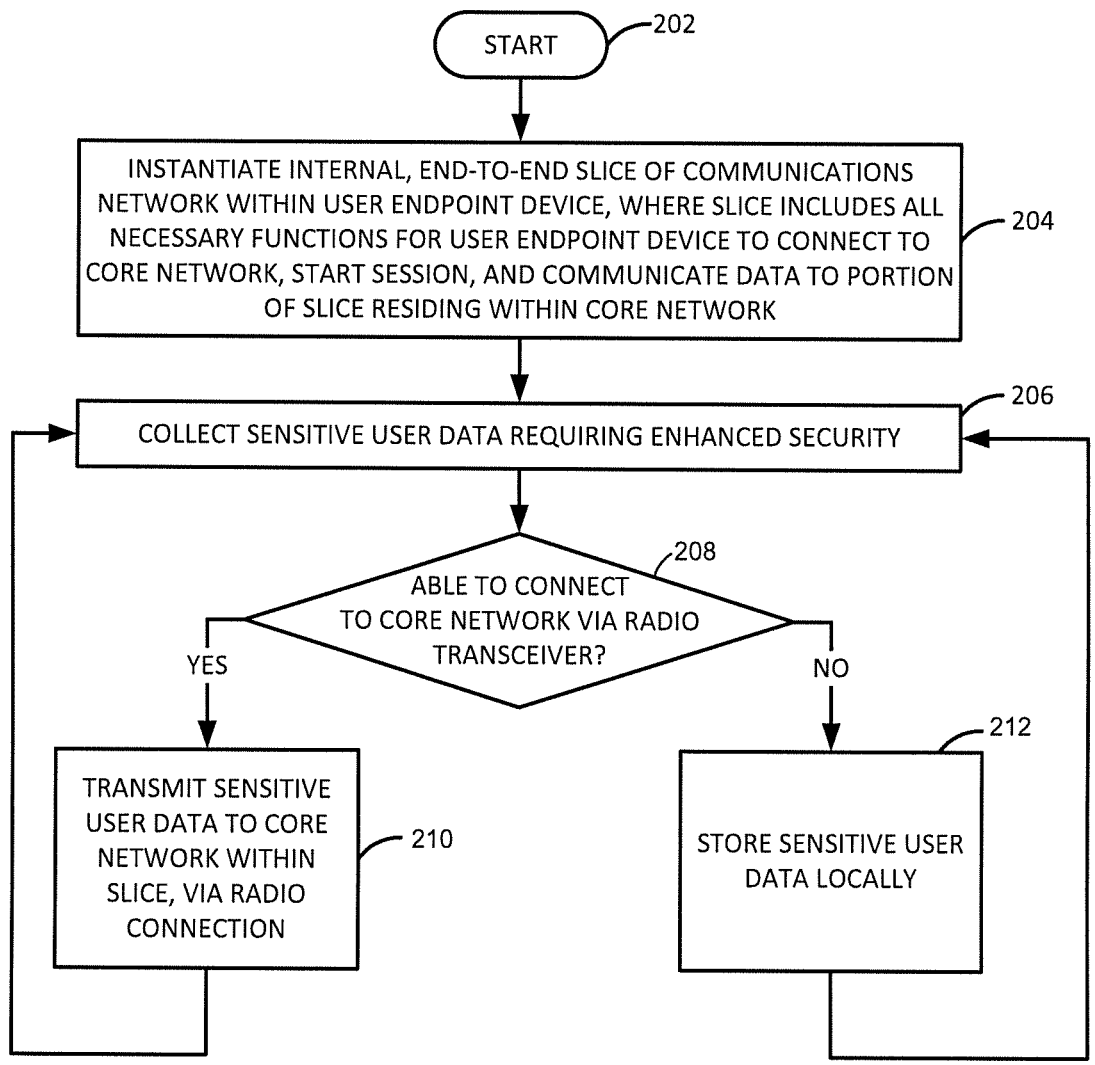
FIG. 2 illustrates a flowchart of an example method for instantiating intelligent service delivery parameters within protected hardware.

To further aid in understanding the present disclosure, FIG. 2 illustrates a flowchart of a first example method 200 for instantiating intelligent service delivery parameters within protected hardware. In one example, the method 200 may be performed by the user endpoint device 108 illustrated in FIG. 1. However, in other examples, the method 200 may be performed by another device. As such, any references in the discussion of the method 200 to the user endpoint device 108 of FIG. 1 are not intended to limit the means by which the method 200 may be performed.

The method 200 begins in step 202. In step 204, an internal, end-to-end slice of a network (e.g., service slice 106 of FIG. 1) is instantiated within a user endpoint device, such as user endpoint device 108 of FIG. 1. The internal slice of the virtual network may be instantiated by a VNF on the user endpoint device and may include all of the necessary functions for the user endpoint device to connect to a core network (e.g., core network 102 of FIG. 1), start a session, and communicate data to a portion of the end-to-end slice residing in the core network (e.g., to the DB 122 of FIG. 1).

For example, these functions may be supported by an MME (e.g., 130 of FIG. 10, a PDN (e.g., PDN 134 of FIG. 1), and a database (e.g., DB 134 of FIG. 1).

In step 206, sensitive user data requiring enhanced security (e.g., health data) is collected by the user endpoint device. The sensitive user data may be collected directly by a sensor integrated in the user endpoint device (e.g., sensor 126 of FIG. 1). For instance, where the end-to-end slice of the network is established to communicate, store, and process user health data, information collected by the sensor may include the user's steps walked, blood sugar, blood pressure, heart rate, blood oxygenation, blood alcohol content, or the like. In another example, the sensitive user data may be input by the user, e.g., through a user input device or graphical user interface (GUI).

In step 207, it is determined whether the user endpoint device is able to connect to the core network via a radio transceiver (e.g., whether the user endpoint device is within range of the core network).

If it is determined in step 207 that a connection to the core network via the radio transceiver is possible, then the method 200 proceeds to step 208. In step 208, the sensitive user data collected in step 206 is transmitted, within the end-to-end slice, to the core network via the radio connection. For instance, as illustrated in FIG. 1, the sensitive user data may travel over a radio connection from the portion of the service slice 106 residing in the user endpoint device 108, through base station 110 and the core slice 104 of the core network 102, to the portion of the service slice 106 residing in the core network 102. The sensitive user data may be stored in a database in the core network (e.g., DB 122 of the service slice 106 of FIG. 1) and made available for further analysis by one or more applications in the core network. The method 200 then returns to step 206 and continues as described above to collect sensitive user data.

If, on the other hand, it is determined in step 207 that a connection to the core network via the radio transceiver is not possible, then the method 200 proceeds to step 210. In step 210, the session continues locally on the user endpoint device, and sensitive user data collected in step 206 is stored locally. For instance, the sensitive user data may be stored in a local, light version of a main service database in the service slice (e.g., DB 134 of FIG. 1).

The method 200 then returns to step 206 and continues as described above to collect sensitive user data. As the sensitive user data is collected, a determination is made as to whether a connection to the core network via the radio transceiver is possible (e.g., whether the user endpoint device is within range of the core network). When possible, the sensitive user data is transmitted to a remote database in the core network; when not possible, the sensitive user data is stored locally until such time as it becomes possible to connect to the core network via the radio transceiver.

Thus, the sensitive user data is transmitted to a remote service database when a radio transceiver of the user endpoint device is able to connect to the core network, or stored locally when the radio transceiver of the user endpoint device is not able to connect to the core network (and subsequently synced with the remote service database when the radio transceiver of the user endpoint device is able to connect to the core network). The sensitive data is therefore transmitted within the secure core network (e.g., a 3GPP or subsequent generation network), without needing to traverse any less secure access networks (e.g., Wi-Fi or other access networks).

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

Figure 3:
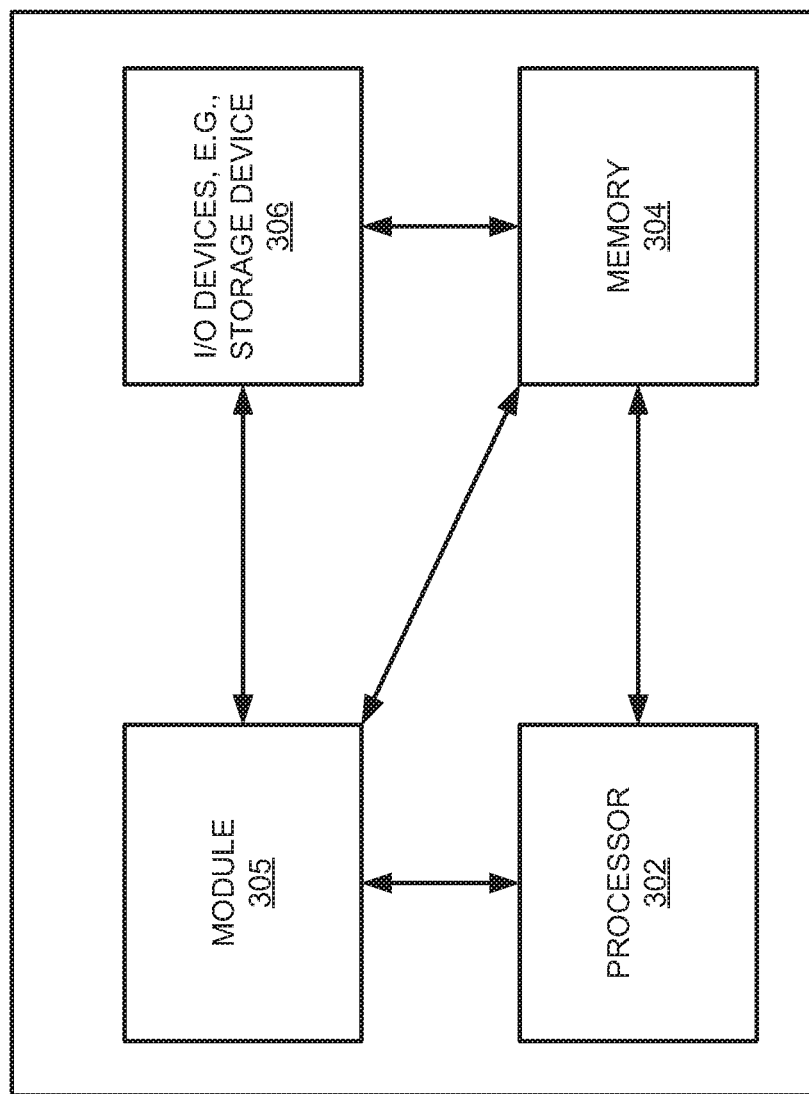
FIG. 3 depicts a high-level block diagram of a computing device specifically programmed to perform the functions described herein.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a user endpoint device (such as might be used to perform the method 200) could be implemented as illustrated in FIG. 3.

As depicted in FIG. 3, the system 300 comprises a hardware processor element 302, a memory 304, a module 305 for instantiating intelligent service delivery parameters within protected hardware, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for instantiating intelligent service delivery parameters within protected hardware may include circuitry and/or logic for performing special purpose functions relating to the monitoring, reporting, and providing feedback relating to a user's eating habits. The input/output devices 306 may include, for example, a camera, a video camera, storage devices (including but not limited to, a tape drive, a floppy drive, a hard disk drive or a compact disk drive), a receiver, a transmitter (e.g., a radio transmitter), a speaker, a microphone, a transducer, a display, a speech synthesizer, a haptic device, an output port, and a user input device (such as a keyboard, a keypad, a mouse, and the like), a health-related sensor (e.g., a glucose monitor, a heart rate monitor, a blood pressure monitor, or a blood alcohol monitor), or another type of sensor.

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for instantiating intelligent service delivery parameters within protected hardware (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for instantiating intelligent service delivery parameters within protected hardware (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
   instantiating within a user endpoint device a first portion of an end-to-end slice of a communications network, wherein the end-to-end slice extends through the communications network and into the user endpoint device, wherein the end-to-end slice is configured to carry data over the communications network subject to a predefined combination of network service metrics, wherein the instantiating is performed by a virtual network function in the user endpoint device, wherein the first portion of the end-to-end slice residing in the user endpoint device includes a resource that mirrors a resource of a second portion of the end-to-end slice residing within the communications network, and wherein the user endpoint device is a wearable smart device;
   determining whether the user endpoint device is able to establish a radio connection to the communications network;
   transmitting user data from the user endpoint device to the communications network via the end-to-end slice based on the determining when the user endpoint device is able to establish the radio connection to the communications network; and
   storing the user data locally in the user endpoint device via the end-to-end slice based on the determining when the user endpoint device is unable to establish the radio connection to the communications network.

2. The method of claim 1, wherein the communications network comprises a third generation partnership project network.

3. The method of claim 1, wherein the user data comprises medical data of a user.

4. The method of claim 3, wherein the medical data comprises a reading of a sensor integrated into the user endpoint device.

5. The method of claim 1, wherein the user data comprises financial data of a user.

6. The method of claim 1, wherein the end-to-end slice includes a local database for storing the user data in the user endpoint device and a remote database for storing the user data in the communications network.

7. The method of claim 6, wherein the transmitting syncs the local database with the remote database.

8. The method of claim 1, further comprising:
   subsequent to the storing, detecting that the user endpoint device is able to establish the radio connection to the communications network; and
   subsequent to the detecting, transmitting the user data from the user endpoint device to the communications network via the end-to-end slice.

9. The method of claim 1, wherein both the resource of the second portion of the end-to-end slice residing within the communications network and the resource that mirrors the resource of the second portion of the end-to-end slice residing within the communications network comprise a mobility management entity.

10. The method of claim 1, wherein both the resource of the second portion of the end-to-end slice residing within the communications network and the resource that mirrors the resource of the second portion of the end-to-end slice residing within the communications network comprise a packet data network.

11. A device, comprising:
   a processor; and
   a computer-readable medium storing instructions which, when executed by the processor, cause the processor to perform operations, the operations comprising:
      instantiating within the device a first portion of an end-to-end slice of a communications network, wherein the end-to-end slice extends through the communications network and into the device, wherein the end-to-end slice is configured to carry data over the communications network subject to a predefined combination of network service metrics, wherein the instantiating is performed by a virtual network function in the device, wherein the first portion of the end-to-end slice residing in the device includes a resource that mirrors a resource of a second portion of the end-to-end slice residing within the communications network, and wherein the device is a wearable smart device;
      determining whether the device is able to establish a radio connection to the communications network;
      transmitting user data from the device to the communications network via the end-to-end slice based on the determining when the device is able to establish the radio connection to the communications network; and storing the user data locally in the device via the end-to-end slice based on the determining when the device is unable to establish the radio connection to the communications network.

12. The device of claim 11, wherein the communications network comprises a third generation partnership project network.

13. The device of claim 11, wherein the end-to-end slice includes a local database for storing the user data in the device and a remote database for storing the user data in the communications network.

14. The device of claim 13, wherein the transmitting syncs the local database with the remote database.

15. The device of claim 11, wherein the operations further comprise:

subsequent to the storing, detecting that the device is able to establish the radio connection to the communications network; and subsequent to the detecting, transmitting the user data from the device to the communications network via the end-to-end slice.

16. The device of claim 11, wherein the user data comprises medical data of a user.

17. The device of claim 16, wherein the medical data comprises a reading of a sensor integrated into the device.

18. The device of claim 11, wherein the user data comprises financial data of a user.

19. A user endpoint device, comprising:

a virtual network function in the user endpoint device to instantiate within the user endpoint device a first portion of an end-to-end slice of a remote communications network, wherein the end-to-end slice extends through the remote communications network and into the user endpoint device, wherein the end-to-end slice is configured to carry data over the remote communications network subject to a predefined combination of network service metrics, wherein the first portion of the end-to-end slice residing in the user endpoint device includes a resource that mirrors a resource of a second portion of the end-to-end slice residing within the remote communications network, and wherein the user endpoint device is a wearable smart device; and a radio transceiver to establish a connection to the remote communications network and to transmit the data to the remote communications network via the end-to-end slice within the user endpoint device.

20. The user endpoint device of claim 19, wherein the user endpoint device further comprises:

a sensor for collecting the data from a user.

\* \* \* \* \*